United States Patent
Brewster et al.

(10) Patent No.: US 8,322,694 B2
(45) Date of Patent: Dec. 4, 2012

(54) VIBRATION ISOLATOR

(75) Inventors: Barrie Dudley Brewster, Brighton (GB); Andrew Waye, Forest Row (GB)

(73) Assignee: Edwards Limited, Crawley, West Sussex (GB)

( * ) Notice: Subject to any disclaimer, the term of this patent is extended or adjusted under 35 U.S.C. 154(b) by 526 days.

(21) Appl. No.: 12/311,515

(22) PCT Filed: Oct. 18, 2007

(86) PCT No.: PCT/GB2007/050645
§ 371 (c)(1),
(2), (4) Date: Dec. 1, 2009

(87) PCT Pub. No.: WO2008/047168
PCT Pub. Date: Apr. 24, 2008

(65) Prior Publication Data
US 2010/0065995 A1    Mar. 18, 2010

(30) Foreign Application Priority Data

Oct. 19, 2006   (GB) .................................. 0620723.7

(51) Int. Cl.
*F16F 1/00* (2006.01)
*F16M 13/00* (2006.01)
*F04B 37/14* (2006.01)

(52) U.S. Cl. ..................... 267/74; 267/136; 267/140.13; 267/287; 285/301; 417/363

(58) Field of Classification Search ................. 267/122, 267/123, 73, 74, 136, 137, 140.11, 140.13, 267/287; 285/49, 299, 300, 301, 226; 403/223; 417/363, 423.4, 423.15, 540
See application file for complete search history.

(56) References Cited

U.S. PATENT DOCUMENTS

| | | | | |
|---|---|---|---|---|
| 2,305,809 A * | 12/1942 | Maisch | .......................... | 285/226 |
| 4,779,854 A * | 10/1988 | Idigkeit et al. | ................. | 267/287 |
| 4,832,321 A * | 5/1989 | Aardema | ....................... | 267/287 |
| 6,814,550 B1 * | 11/2004 | Adamietz et al. | .............. | 417/363 |
| 7,300,261 B2 * | 11/2007 | Cafri et al. | ..................... | 417/363 |

(Continued)

FOREIGN PATENT DOCUMENTS

| DE | 199 02 215 A1 | 7/2000 |
| WO | WO 2005/078288 A1 | 8/2005 |

OTHER PUBLICATIONS

Fuhrmann Bernd; English Language Abstract of Publication No. DE 19902215; "Exhaust Pipe Link Fitting for Use on Road Vehicle Decouples Vibrations Using Two Bushes Linked by Large Number of Radially Angled Bridging Flanges," Gillet Heinrich GmbH; Jul. 27, 2000.

(Continued)

*Primary Examiner* — Thomas J Williams

(57) ABSTRACT

A vibration isolator is described for inhibiting transfer of vibration to an apparatus during evacuation thereof by a pump. The isolator comprising a bellows for isolating from the ambient atmosphere fluid drawn from the apparatus by the pump. A first flange is connected to one end of the bellows for mounting the isolators the apparatus, and a second flange is connected to the other end of the bellows for mounting the isolator to the pump. The bellows surrounds a resilient element, preferably a helical tension spring, which is substantially co-axial with the bellows. The resilient element has a first end located proximate to the first flange and connected to the second flange, and a second end located proximate to the second flange and connected to the first flange.

20 Claims, 7 Drawing Sheets

U.S. PATENT DOCUMENTS

| | | | |
|---|---|---|---|
| 8,181,944 B2* | 5/2012 | Brewster | 267/136 |
| 2004/0135449 A1 | 7/2004 | Beyer et al. | |
| 2005/0204754 A1* | 9/2005 | Vuillermoz | 62/55.5 |
| 2005/0248071 A1* | 11/2005 | Ben-Maimon | 267/136 |
| 2008/0085202 A1* | 4/2008 | Namiki et al. | 417/540 |

OTHER PUBLICATIONS

United Kingdom Search Report of Application No. GB 0620723.7 mailed Jul. 18, 2007; Claims searched: 1 to 17; Date of search: Jul. 17, 2007.

PCT Notification of Transmittal of the International Search Report and the Written Opinion of the International Searching Authority, or the Declaration of International Application No. PCT/GB2007/050645; Date of mailing: Feb. 8, 2008.

PCT International Search Report of International Application No. PCT/GB2007/050645; Date of mailing of the International Search Report: Feb. 8, 2008.

PCT Written Opinion of the International Searching Authority of International Application No. PCT/GB2007/050645; Date of mailing: Feb. 8, 2008.

* cited by examiner

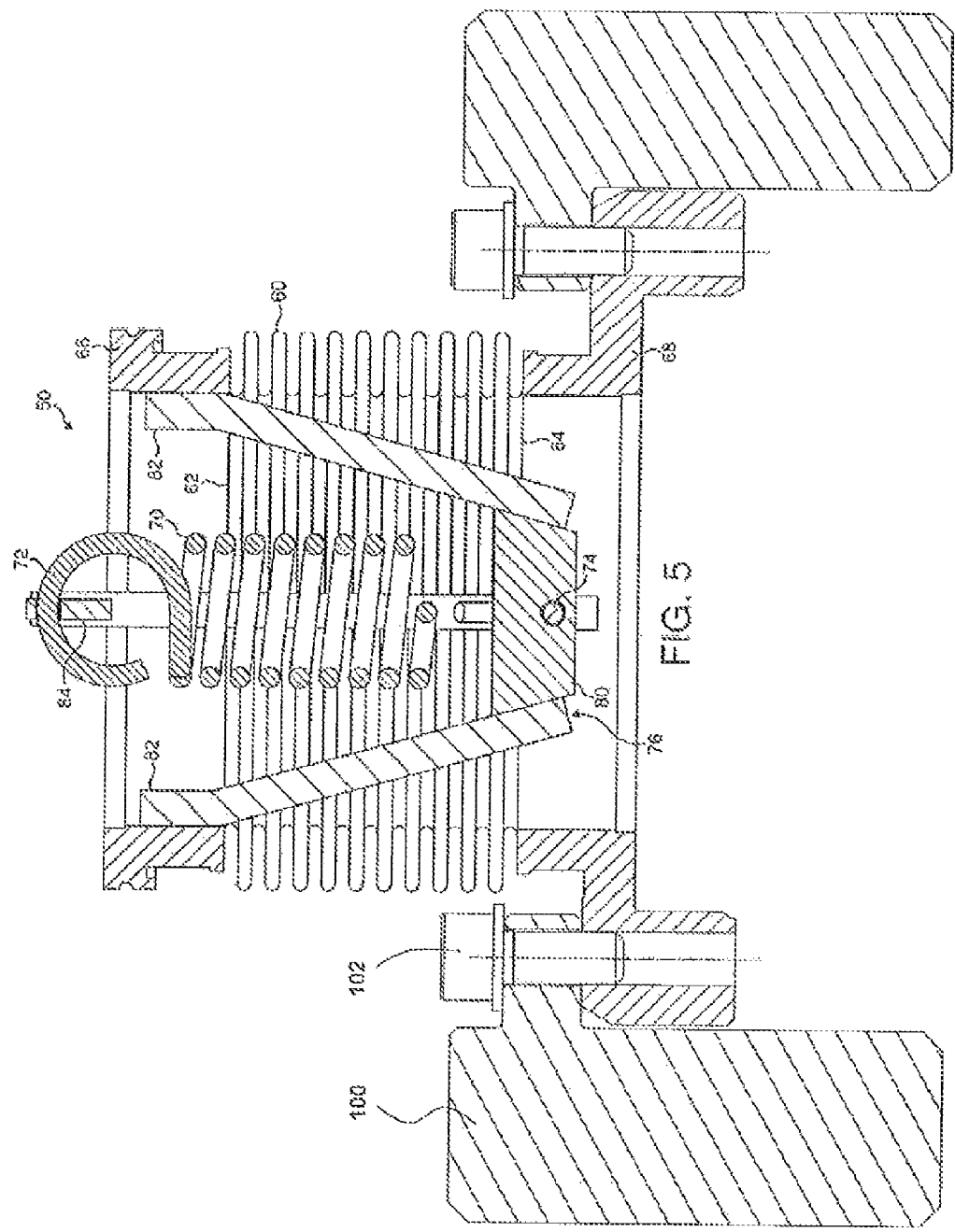

VIBRATION ISOLATOR

FIELD OF THE INVENTION

This invention relates to a vibration isolator for inhibiting transfer of vibration to an apparatus during evacuation thereof by a pump.

BACKGROUND OF THE INVENTION

Vibration isolators are used to reduce the vibration transmitted to an apparatus from a high-vacuum pump, for example, a turbomolecular pump, during evacuation of the apparatus. The use of a vibration isolator is particularly desirable when the apparatus under evacuation is sensitive to mechanical vibration. For example, the transmission of vibrations to an electron microscope can lead to a loss of resolution of the microscope, while the transmission of vibrations to a process tool can lead to manufacturing errors in products located within the tool.

SUMMARY OF THE INVENTION

In a first aspect, the present invention provides a vibration isolator for inhibiting transfer of vibration to an apparatus during evacuation thereof by a pump, the isolator comprising a bellows for conveying fluid drawn from the apparatus to the pump, the bellows having first and second open ends, and a resilient element substantially co-axial with and surrounded by the bellows, the resilient element having a first end connected to one of the first and second open ends, and a second end connected to the other one of the first and second open ends.

BRIEF DESCRIPTION OF THE DRAWINGS

The invention will now be described, by way of example only, with reference to the accompanying drawings, in which:

FIG. 5 is a cross-sectional view of the isolator of FIG. 3, as viewed along line B-B.

DETAILED DESCRIPTION OF THE INVENTION

Figure 1:
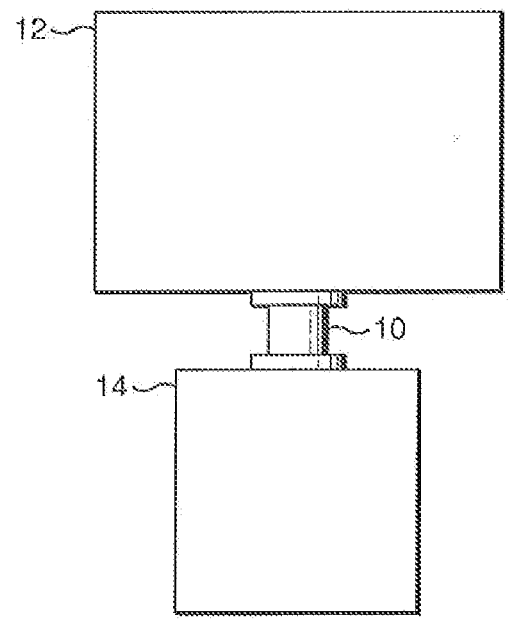
FIG. 1 illustrates an isolator connected between a pump and an apparatus to be evacuated by the pump.

With reference to FIG. 1, a vibration isolator 10 is typically connected between the fluid exhaust of the apparatus 12 to be evacuated and the fluid inlet of the vacuum pump 14.

Figure 2:
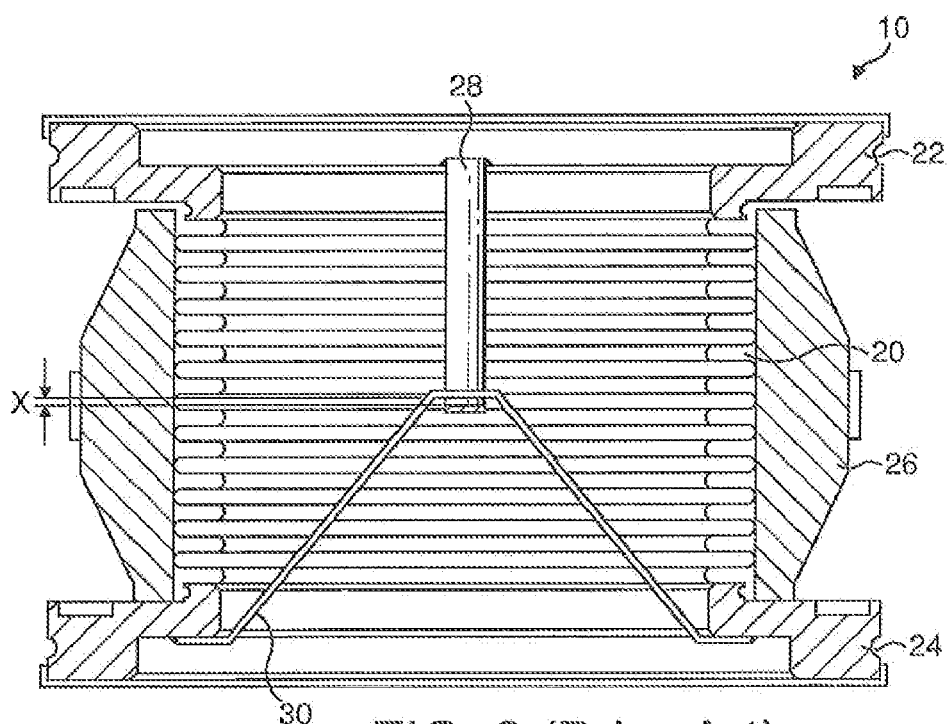
FIG. 2 is a cross-section through a known vibration isolator.

FIG. 2 illustrates in more detail one example of a known vibration isolator 10. The isolator 10 comprises a steel bellows 20 that defines a flow path through the isolator 10 for fluid pumped from the apparatus 12 by the pump 14. A first annular flange 22 is welded to one end of the bellows 20 for connecting the isolator 10 to the apparatus 12 to be evacuated, and a second annular flange 24 is welded to the other end of the bellows 20 for connecting the isolator 10 to the pump 14.

The bellows 20 is surrounded by an elastomeric cylinder 26 mounted on the second flange 24 that prevents the bellows 20 from collapsing under compression when the fluid within the bellows is at a sub-atmospheric pressure, and provides damping of vibrations generated during use of the pump 14.

The isolator 10 further comprises a pair of interlinking members that prevent the bellows 20 from extending under the weight of a pump 14 connected to the second flange 24 when the apparatus is not under evacuation. Each interlinking member is in the form of a V-shaped metallic strap, with the first strap 28 being welded to the first flange 22, and the second strap 30 being welded to the second flange 24 so that the straps 28, 30 are linked. In the illustrated example, when the isolator 10 is not connected to any other components, the straps 28, 30 are spaced apart by a distance x extending along the axis of the bellows 20.

The parameter governing transmission of vibration from the pump 14 to the apparatus 12 is the stiffness of the isolator 10. As the bellows 20 typically has a relatively low inherent axial stiffness, there is minimal transmission of vibration to the apparatus 12 through the bellows 20. Furthermore, during evacuation of the apparatus, the isolator 10 is under compression, and so the straps 28, 30 are not in contact. Consequently, the primary route for the transmission of vibrations to the apparatus 12 is through the elastomeric cylinder 26, which becomes sandwiched between the flanges 22, 24 during evacuation of the apparatus. However, when the elastomeric cylinder 26 is compressed in this manner, its hyperelasticity, reflected in a non-linear progressive stiffness characteristic, causes its axial stiffness to gradually increase. The increasing axial stiffness of the cylinder 26 reduces the ability of the isolator 10 to deflect, which progressively enhances the transmission of vibration to the apparatus 12.

In a first aspect, the present invention provides a vibration isolator for inhibiting transfer of vibration to an apparatus during evacuation thereof by a pump, the isolator comprising a bellows for conveying fluid drawn from the apparatus to the pump, the bellows having first and second open ends, and a resilient element substantially co-axial with and surrounded by the bellows, the resilient element having a first end connected to one of the first and second open ends, and a second end connected to the other one of the first and second open ends.

The invention can thus provide a vibration isolator having a relatively simple structure and with relatively low axial, shear and tilt stiffnesses.

The bellow may be integral with the pump, with the second open end of the bellows being connected to the body of the pump. For example, this open end of the bellows may be connected to an annular flange integral with the housing of the pump. Alternatively, a separate flange may be connected to this second open end of the bellows for mounting the isolator to a pump, with one end of the resilient element being connected to the second flange. In either case, another flange is preferably connected to the first open end of the bellows for mounting the isolator to an apparatus to be evacuated, with the other end of the resilient element being connected to the first flange.

In the preferred embodiment, the first end of the resilient element is located proximate to the first open end of the bellows and connected to the second open end of the bellows, and the second end of the resilient element is located proximate to the second open end of the bellows and connected to the first open end of the bellows.

The isolator may be in the form of a component which is mounted to both the apparatus and the pump, and so in a second aspect the present invention provides a vibration isolator for inhibiting transfer of vibration to an apparatus during evacuation thereof by a pump, the isolator comprising a bellows for conveying fluid drawn from the apparatus to the pump, a first flange connected to one end of the bellows for mounting the isolator to the apparatus, a second flange connected to the other end of the bellows for mounting the isolator to the pump, and a resilient element co-axial with and surrounded by the bellows, the resilient element having a first end located proximate to the first flange and connected to the second flange, and a second end located proximate to the second flange and connected to the first flange.

The vibration isolator preferably comprises a first connector connected to the first flange, and a second connector connected to the second flange, with the first end of the resilient member being attached to the second connector, and the second end of the resilient member being attached to the first connector. These connectors are preferably overlapping, and thus are preferably angularly offset. In the preferred embodiment, the first connector is substantially orthogonal to the second connector. Each connector may be provided by an arch-shaped connector having ends connected to its respective flange and a central portion attached to the resilient element.

The isolator may comprise damping means for damping oscillation or vibration of the resilient element. The damping means may preferably comprise a plastics element which contacts at least a portion of the resilient element during use.

Damping means may be located between each end of the resilient member and its respective connector. Alternatively, or additionally, an elastomeric sleeve may surround the bellows.

The isolator may comprise an auxiliary mass which can be located to increase a resistance to axial compression of said bellows when a fluid within said bellows is at a sub-atmospheric pressure. Preferably, the second flange comprises connection means for connecting said auxiliary mass thereto.

The resilient element is preferably under tension, and thus may be provided by a helical tension spring. The tension spring is preferably pre-tensioned.

Features described above in relation to the second aspect of the invention are equally applicable to the first aspect, and vice versa.

Figure 3:
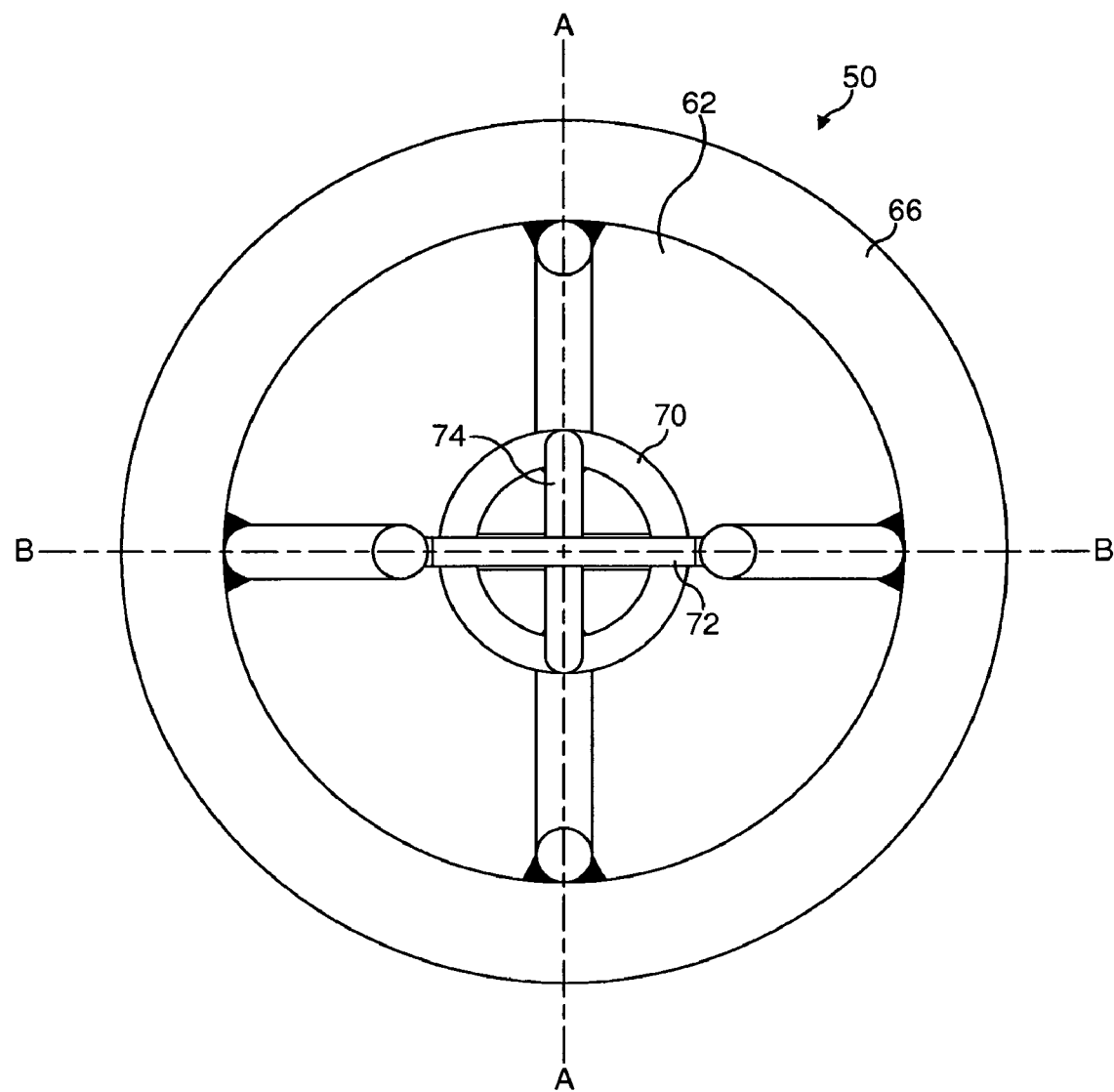
FIG. 3 is a top view of an example of a vibration isolator according to the present invention.

FIG. 3 illustrates a vibration isolator 50 for connection between the fluid exhaust of an apparatus to be evacuated, and the fluid inlet of a vacuum pump. The isolator 50 comprises a steel bellows 60 of generally cylindrical form having a first open end 62 and a second open end 64. The bellows 60 defines a flow path through the isolator 50 for fluid pumped from the apparatus by the pump. A first annular flange 66 is welded to the first open end 62 of the bellows 60 for connecting the isolator 50 to the apparatus to be evacuated, and a second annular flange 68 is welded to the second open end 64 of the bellows 60 for connecting the isolator 50 to the pump.

The bellows 60 surrounds a resilient element 70, which is preferably under tension in the normal, unloaded condition and therefore is preferably in the form of a helical tension spring. The tension spring is preferably a pre-tensioned spring. The resilient element 70 is substantially co-axial with the bellows 60. The resilient element 70 has a first end 72 located proximate to the first flange 66, and a second end 74 located proximate to the second flange 68.

A first connector 76 is provided for connecting the resilient element 70 to the first open end 62 of the bellows 60, and a second connector 78 is provided for connecting the resilient element 70 to the second open end 64 of the bellows 60. In this example, the first connector 76 is in the form of an arch-shaped connector, having a central portion 80 attached to the second end 74 of the resilient element 70 and ends 82 welded or otherwise connected to the first flange 66. The second connector 78 is similarly in the form of an arch-shaped connector, having a central portion 84 attached to the first end 72 of the resilient element 70 and ends 86 welded or otherwise connected to the second flange 68. The first and second connectors 76, 78 are angularly offset, and in this example are substantially orthogonal.

Figure 4A:
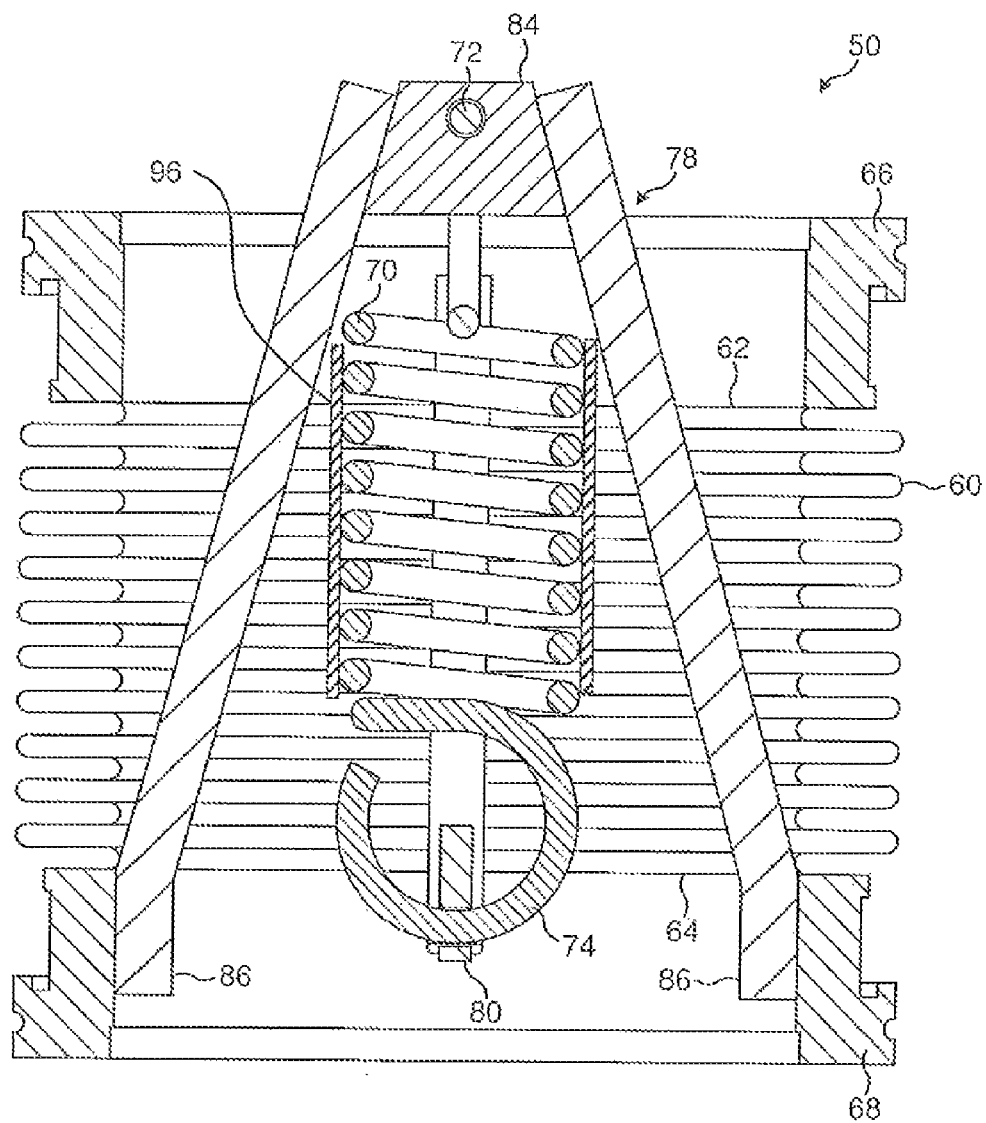
FIGS. 4A-4C illustrate various cross-sectional views of the isolator of FIG. 3, as viewed along line A-A, in accordance with various embodiments of the invention.
Figure 4B:
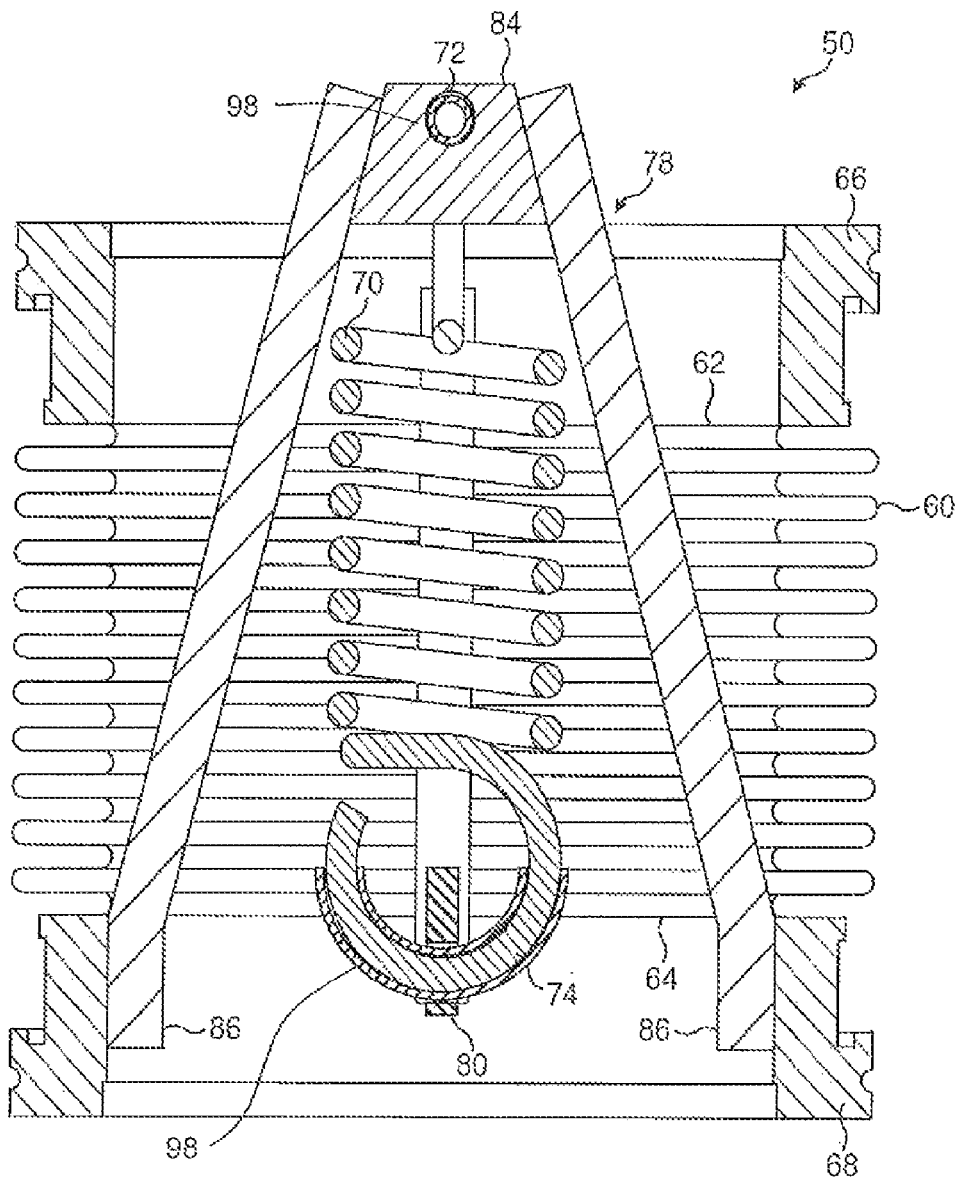
Figure 4C:
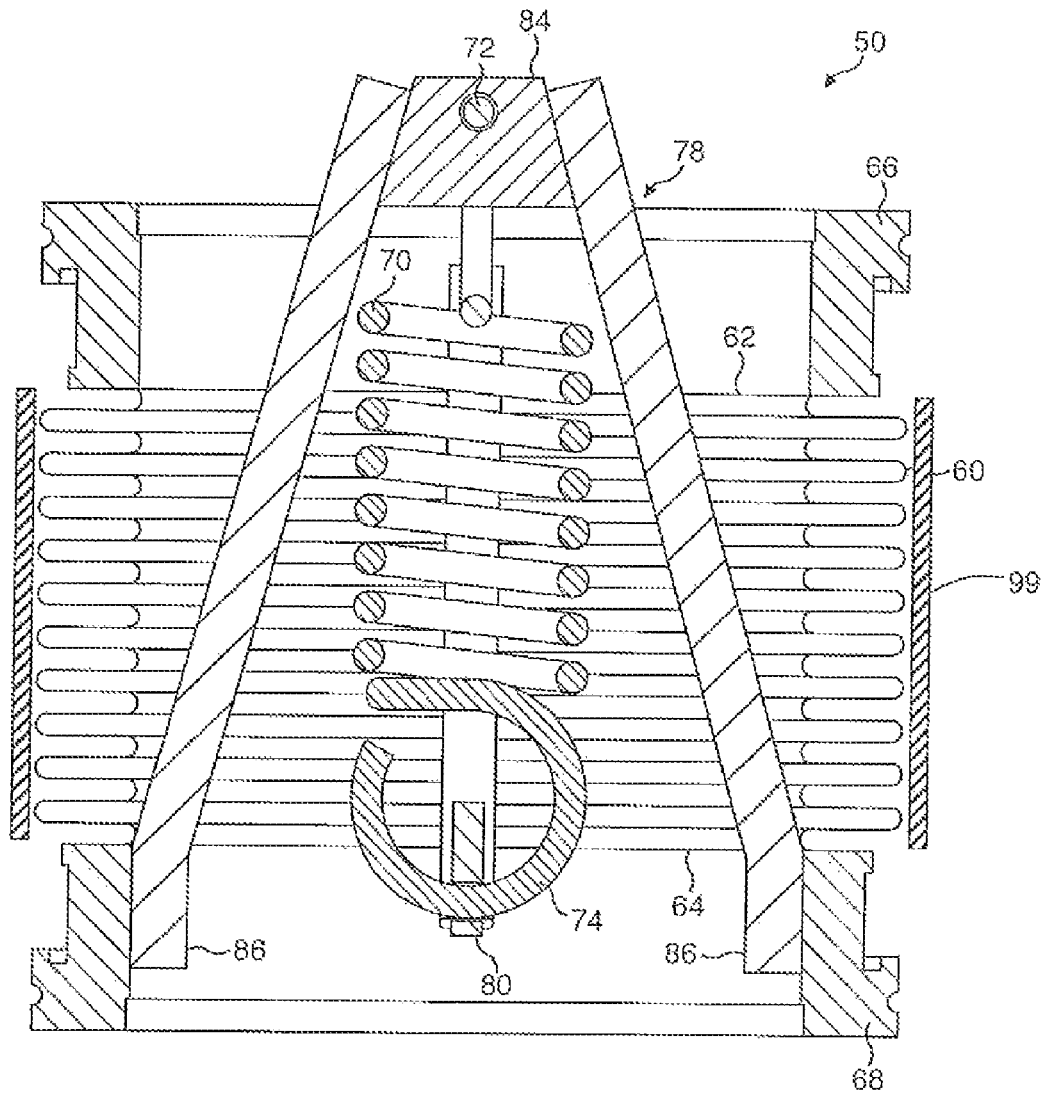
Figure 6:
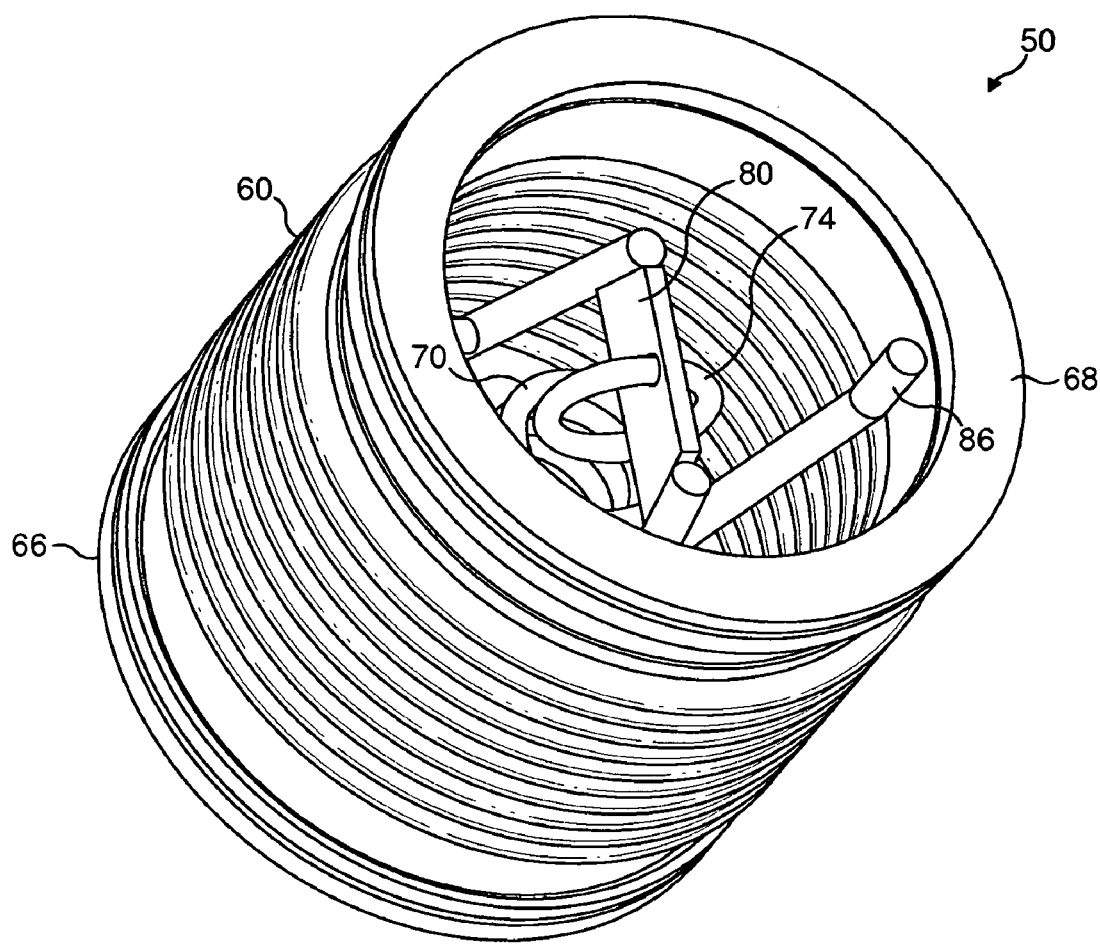
FIG. 6 is an isometric rear view of the isolator of FIG. 3.

A damping element (96, 98, or 99 as shown in FIG. 4A, 4B, or 4C, respectively) may be located for damping oscillation or vibration of the resilient element 70 during evacuation. The damping element 96, 98, or 99 may be made from plastics, such as Viton or PTFE, which is suitable for use at high vacuum. The damping element 96, 98, or 99 preferably contacts at least a portion of the resilient element 70 during evacuation to achieve a required damping effect.

The damping element 96 or 98 may be located between each end 72, 74 of the resilient member 70 and its respective connector 76, 78. For example, an elastomeric o-ring or other elastomeric member may be provided about the resilient element 70 to dampen the surge frequency of the resilient element 70 and/or dampen lateral vibration of the connectors 76, 78. In other arrangements, the damping element 96 or 98 comprises a sleeve around a circumference of the resilient element 70; an element extending through a bore of the resilient element; or an o-ring supported by first and second connectors 76, 78 so that it contacts the resilient element during use. Alternatively, or additionally, an elastomeric sleeve (99 as shown in FIG. 4C) may be located about the bellows 60. Such a sleeve would be relatively thin in comparison to the elastomeric cylinder 26 of the known isolator 10 so that the sleeve has only minimal contribution to the stiffness of the isolator 50.

The resilient element 70 provides an axial constraint which limits the axial expansion of the bellows 60 both in a normal, unloaded condition of the isolator 50, and when the isolator 50 is connected between a vacuum pump and an apparatus to be evacuated, and thus when a gravitational force acting on the pump tends to expand the bellows 60.

During evacuation of the apparatus, a large static load acts on the pump as a result of the difference between external atmospheric pressure and the internal sub-atmospheric pressure, which load acts to axially compress the isolator 50. The flanges 66, 68 of the isolator 50 are urged together, which in turn urges apart the ends 72, 74 of the resilient member 70. In response, the resilient member 70 acts in tension to provide a resistance to the compressive axial loading experienced by the isolator 50.

End stops may be provided to limit compression of the bellows 60 in the event of a failure of the resilient element 70 during evacuation of the apparatus connected to the first flange 66, and/or to limit extension of the bellows 60 in the event that the resilient element 70 becomes coil bound. For example, suitable end stops may be provided by interlocking tabs located on the connectors 76, 78. In the event of a catastrophic failure of the pump connected to the second flange 68, which will tend to cause the second flanges 68 to rotate relative to the first flange 66, the connectors 76, 78, which are angularly displaced with respect to each other, will engage and dissipate the energy generated by the pump failure.

A mass of the pump acting under the effect of gravity provides resistance to axial compression of bellows 60 in addition to the resistance provided by resilient element 70. To a lesser extent, a mass of the lower flange 68, connector 78 and bellows 60 also resists such axial compression. If a mass of the pump is relatively low, the axial compressive force on the bellows 60 may be sufficient for the bellows to buckle. It may be desirable to provide an auxiliary mass 100 which can be fixed to one of the pump or the isolator to resist axial compression of the bellows 60. Preferably, a lower flange 68 of the isolator is provided with connection means 102 for connecting an auxiliary mass 100 to the lower flange.

The inhibition of the transmission to the apparatus of an oscillating force associated with vibrations of the pump during evacuation of the apparatus is determined by the axial, shear and tilt stiffnesses of the isolator 50. The axial stiffness of the isolator 50 is determined by the axial stiffness of the bellows 60, and the axial stiffness of the resilient element 70. As the resilient element 70 may have a very low axial stiffness in comparison to the elastomeric cylinder 26 of the known isolator 10, the isolator 50 may have an axial stiffness which is significantly lower, for example around ten times lower, than the axial stiffness of the known isolator 10.

The shear and tilt stiffnesses of the isolator 50 are determined by the radial locations of the bellows 60 and the resilient element 70 about the axis of the isolator 50. Due to the axial location of the resilient element 70 within the bellows 60, the resilient element 70 contributes very little to the shear and tilt stiffnesses of the isolator 10, whilst the elastomeric cylinder 26 of the known isolator 10, which surrounds the bellows 20 of that isolator 10, contributes substantially to the shear and tilt stiffnesses of the known isolator 10.

Consequently, the isolator 50 has shear and tilt stiffnesses which are significantly lower than those of the known isolator 10.

Whilst the presence of a resilient element 70 within the bellows 60 may detrimentally affect the conductance of the isolator 50 in comparison to the known isolator 10 when the isolators 10, 50 have bellows 20, 60 of comparable internal diameter, it is to be noted that the internal diameter of the bellows 60 of the isolator 50 is not constrained by the presence of any elements located radially outside the bellows 60. In contrast, the internal diameter of the bellows 20 of the known isolator 10 is constrained by the presence of, and therefore the thickness of, the elastomeric cylinder 26, when there is a limit to the external diameter of the isolator. In this case, the internal diameter of the bellows 60 may be larger than that of the bellows 20 of the known isolator 10, and may be such that the conductance of the isolator 50 is greater than that of the isolator 10. As a result, there is a greater degree of freedom in selecting the conductance of the isolator 50, by appropriate choice of the internal diameter of the bellows 60, to suit the requirements of the evacuation system of which the pump and isolator 50 form part.

Resilient member 70 may be provided by a compression spring, which may be surrounded by a sleeve or other constraining member. In this case, the first end 72 of the resilient member 70 would be connected to the first flange 66 by an alternative form of connector, and the second end 74 of the resilient member 70 would be connected to the second flange 68 by a similar form of connector.

While the foregoing description and drawings represent various embodiments of the present invention, it will be apparent to those skilled in the art that various changes and modifications may be made therein without departing from the true spirit and scope of the present invention.

We claim:

1. A vibration isolator for inhibiting transfer of vibration to an apparatus during evacuation by a pump comprising: a bellows having a first and a second open end for conveying fluid drawn from the apparatus to the pump; and a resilient element having a first end connected to one of the first and second open ends, and a second end connected to the other one of the first and second open ends, the resilient element positioned substantially co-axial with and surrounded by the bellows, wherein the resilient element is a helical tension spring.

2. The vibration isolator according to claim 1 further comprising a first flange connected to the first open end of the bellows for mounting the isolator to an apparatus to be evacuated, one of the first and second ends of the resilient element being connected to the first flange.

3. The vibration isolator according to claim 2 further comprising a second flange connected to the second open end of the bellows for mounting the isolator to a pump, the other one of the first and second ends of the resilient element being connected to the second flange.

4. The vibration isolator according to claim 1 wherein the resilient element is under tension.

5. The vibration isolator according to claim 1 wherein the tension spring is pre-tensioned.

6. The vibration isolator according to claim 1 wherein the first end of the resilient element is located proximate to the first open end of the bellows and connected to the second open end of the bellows, and the second end of the resilient element is located proximate to the second open end of the bellows and connected to the first open end of the bellows.

7. The vibration isolator according to claim 1 comprising a damping element for damping oscillation or vibration of the resilient element.

8. The vibration isolator according to claim 7 wherein said damping element comprises a plastics element which contacts at least a portion of the resilient element during use.

9. The vibration isolator according to claim 7 wherein said damping element is located between each end of the resilient member and a corresponding connector thereof.

10. The vibration isolator according to claim 1 further comprising an elastomeric sleeve surrounding the bellows.

11. The vibration isolator according to claim 1 further comprising an auxiliary mass which can be located to increase a resistance to axial compression of said bellows when a fluid within said bellows is at a sub-atmospheric pressure.

12. The vibration isolator according to claim 11 wherein said second flange comprises connection means for connecting said auxiliary mass to the second flange.

13. A vibration isolator for inhibiting transfer of vibration to an apparatus during evacuation thereof by a pump comprising: a bellows for conveying fluid drawn from the apparatus to the pump; a first flange connected to one end of the bellows for mounting the isolator to the apparatus; a second flange connected to the other end of the bellows for mounting the isolator to the pump; and a resilient element substantially co-axial with and surrounded by the bellows, the resilient element having a first end located proximate to the first flange and connected to the second flange, and a second end located proximate to the second flange and connected to the first flange, wherein the resilient element is a helical tension spring.

14. The vibration isolator according to claim 13 wherein the resilient element is under tension.

15. The vibration isolator according to claim 13 wherein the tension spring is pre-tensioned.

16. The vibration isolator according to claim 13 further comprising a first connector connected to the first flange, and a second connector connected to the second flange, the first end of the resilient member being attached to the second connector, and the second end of the resilient member being attached to the first connector.

17. The vibration isolator according to claim 16 wherein the connectors are angularly offset.

18. The vibration isolator according to claim 16 wherein the first connector is substantially orthogonal to the second connector.

19. The vibration isolator according to claim 16 wherein the first connector and the second connector each comprises an arch-shaped connector having ends connected to its respective flange and a central portion connected to the resilient element.

20. The vibration isolator according to claim 13 comprising a damping element for damping oscillation or vibration of the resilient element.

* * * * *